United States Patent [19]

Watanabe et al.

[11] Patent Number: 4,670,230

[45] Date of Patent: * Jun. 2, 1987

[54] PROCESS FOR SELECTIVELY STRIPPING IRON IONS FROM AN ORGANIC SOLVENT

[75] Inventors: Morio Watanabe, Hyogo; Sanji Nishimura, Kyoto, both of Japan

[73] Assignee: Solex Research Corporation of Japan, Tokyo, Japan

[*] Notice: The portion of the term of this patent subsequent to Feb. 28, 2001 has been disclaimed.

[21] Appl. No.: 757,610

[22] Filed: Jul. 22, 1985

Related U.S. Application Data

[63] Continuation of Ser. No. 449,826, Dec. 14, 1982, abandoned.

[30] Foreign Application Priority Data

Mar. 25, 1982 [JP] Japan .................................. 57-46261
Aug. 10, 1982 [JP] Japan .................................. 57-137954

[51] Int. Cl.$^4$ ...................... C01G 9/00; C01G 11/00; C01G 21/00; C01G 49/00
[52] U.S. Cl. ..................................... 423/98; 423/100; 423/109; 423/139; 423/150; 423/395; 423/464; 423/471; 423/491; 423/544; 423/622
[58] Field of Search ............... 423/100, 109, 139, 150, 423/DIG. 14, 98, 395, 464, 471, 491, 544, 622

[56] References Cited

U.S. PATENT DOCUMENTS 2,860,031 11/1958 Grinstead .................. 423/DIG. 14
3,666,446 5/1972 Cook ................................. 423/100
3,966,569 6/1976 Reinhardt et al. .................. 423/139
4,200,504 4/1980 Thorsen ............................... 423/139
4,434,002 2/1984 Watanabe et al. .................. 423/139
4,490,338 12/1984 DeSchepper et al. ............. 423/139
4,497,655 2/1985 Watanabe et al. .................. 423/139

FOREIGN PATENT DOCUMENTS 2042963 2/1972 Fed. Rep. of Germany ........ 423/139
3012246 2/1980 Fed. Rep. of Germany ...... 423/139
2935793 3/1981 Fed. Rep. of Germany ...... 423/139

OTHER PUBLICATIONS

Wells, *Nuclear Science and Engineering*, 17 (1963) pp. 259–267.
Agers, *Mining Engineering* (Dec. 1965) pp. 76–80.

*Primary Examiner*—John Doll
*Assistant Examiner*—Robert L. Stoll
*Attorney, Agent, or Firm*—Toren, McGeady & Associates

[57] ABSTRACT

A process for selectively stripping and separating iron ions from an organic solvent (A) which comprises bringing the organic solvent (A) containing iron and zinc ions, and containing one or more compounds selected from the group consisting of alkyl phosphoric acid, alkyl-aryl phosphoric acid, alkyl thio phosphoric acid and alkyl-aryl thio phosphoric acid together with a petroleum hydrocarbon as a diluent, into contact with an aqueous solution containing $NH_4^+$ and $F^-$ ions so as to selectively strip the iron ions into the aqueous solution despite the coexistence of zinc ions.

3 Claims, 10 Drawing Figures

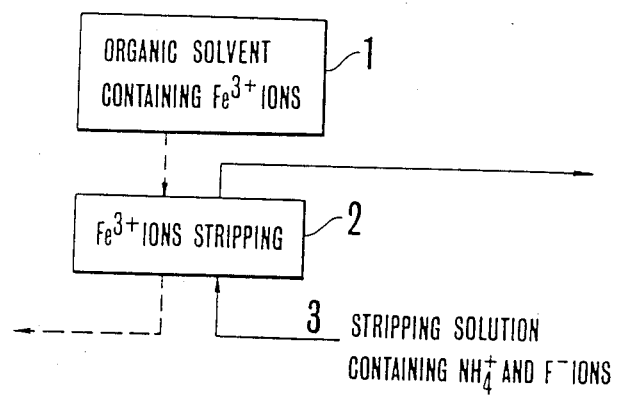
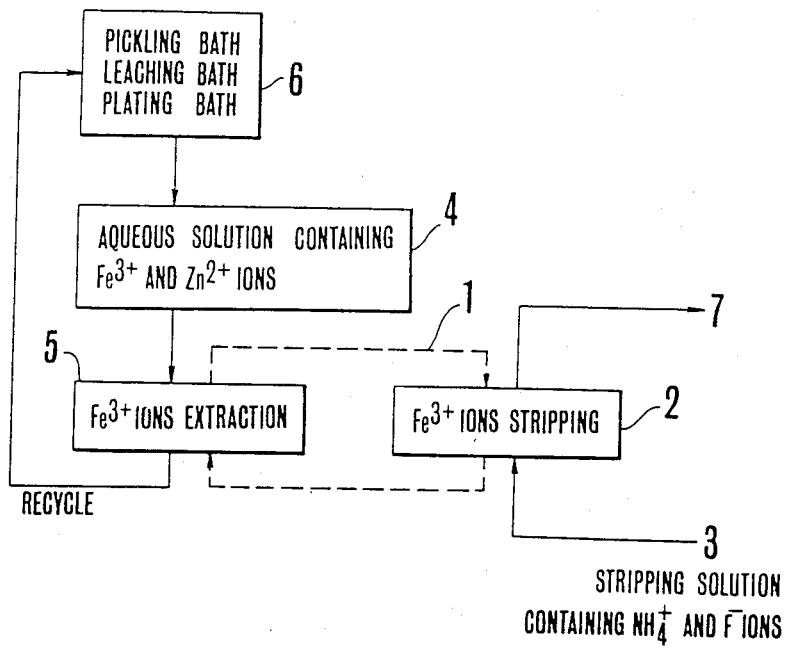

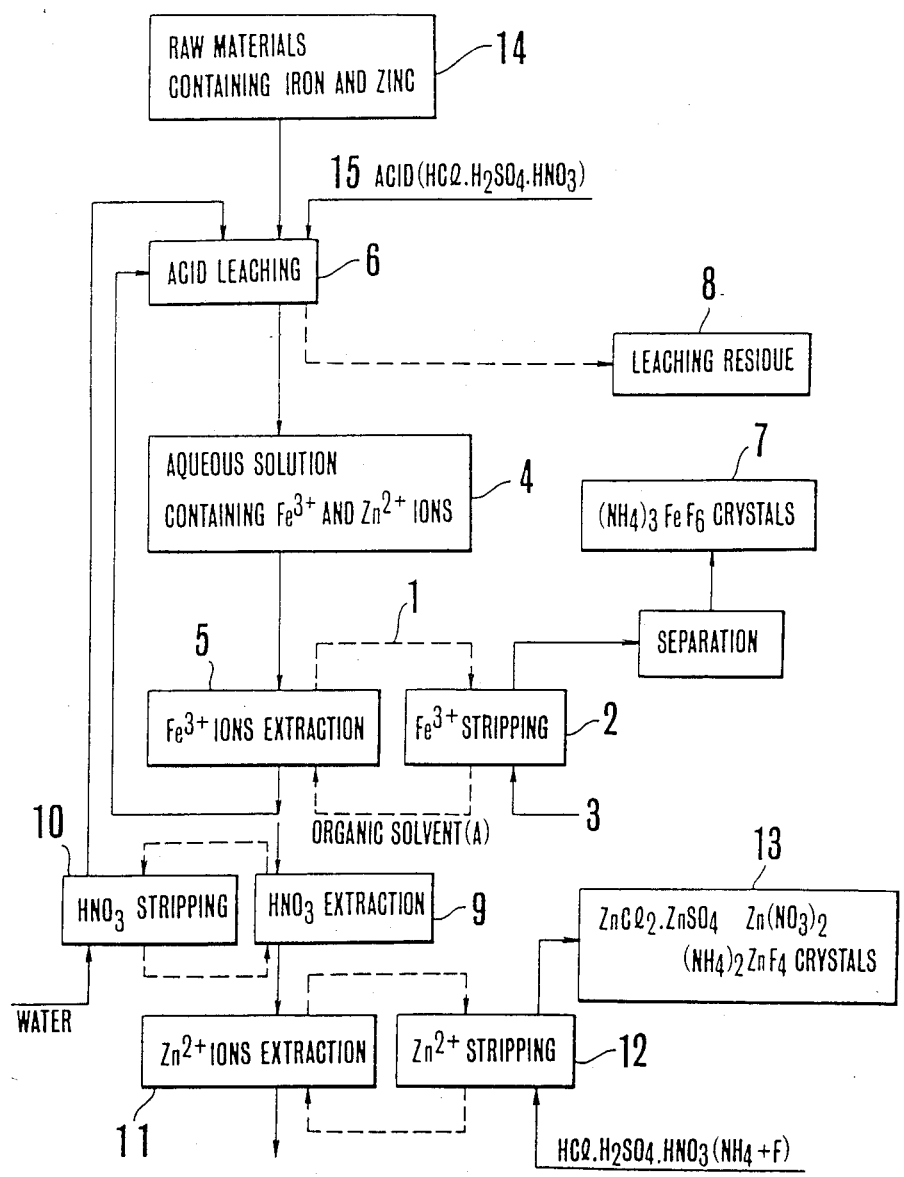

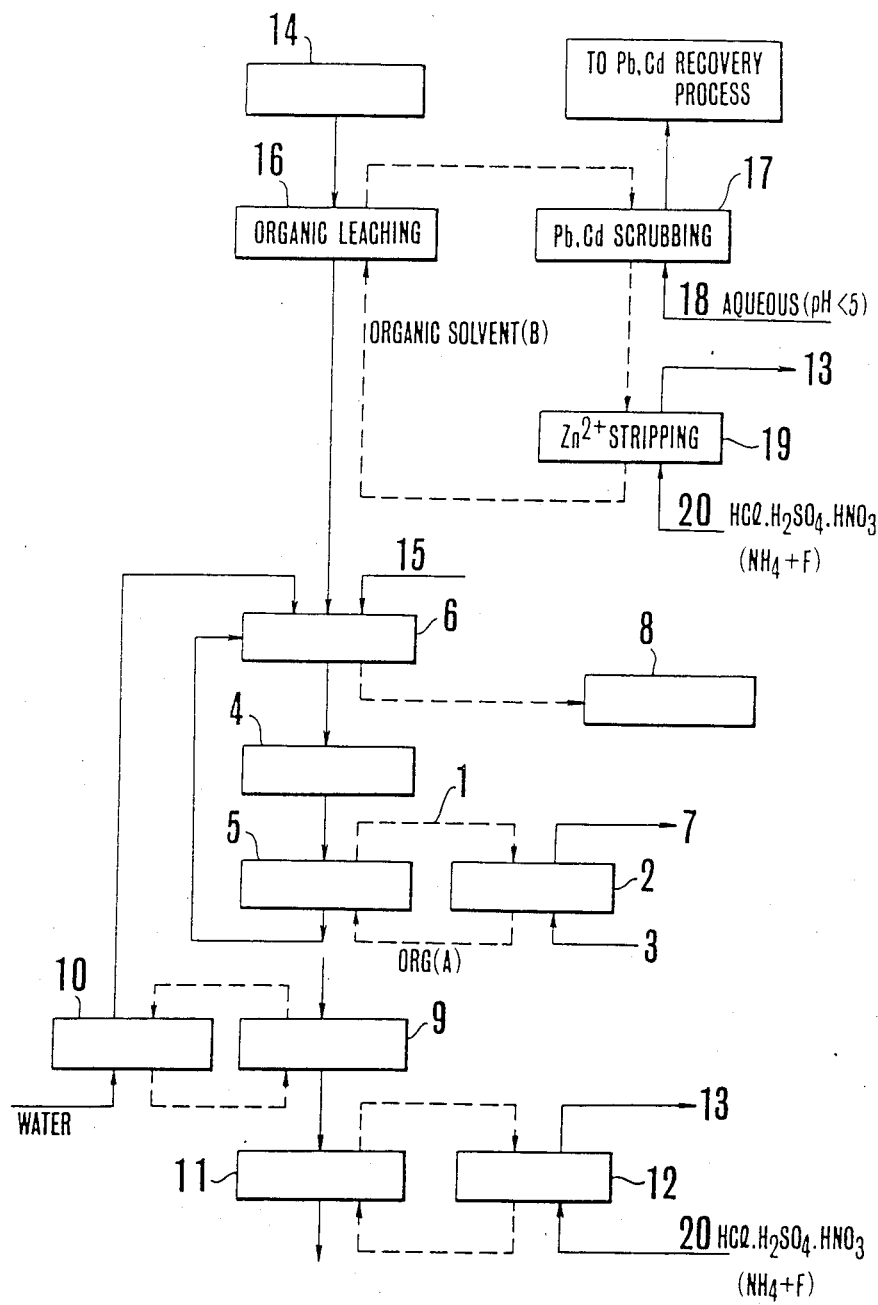

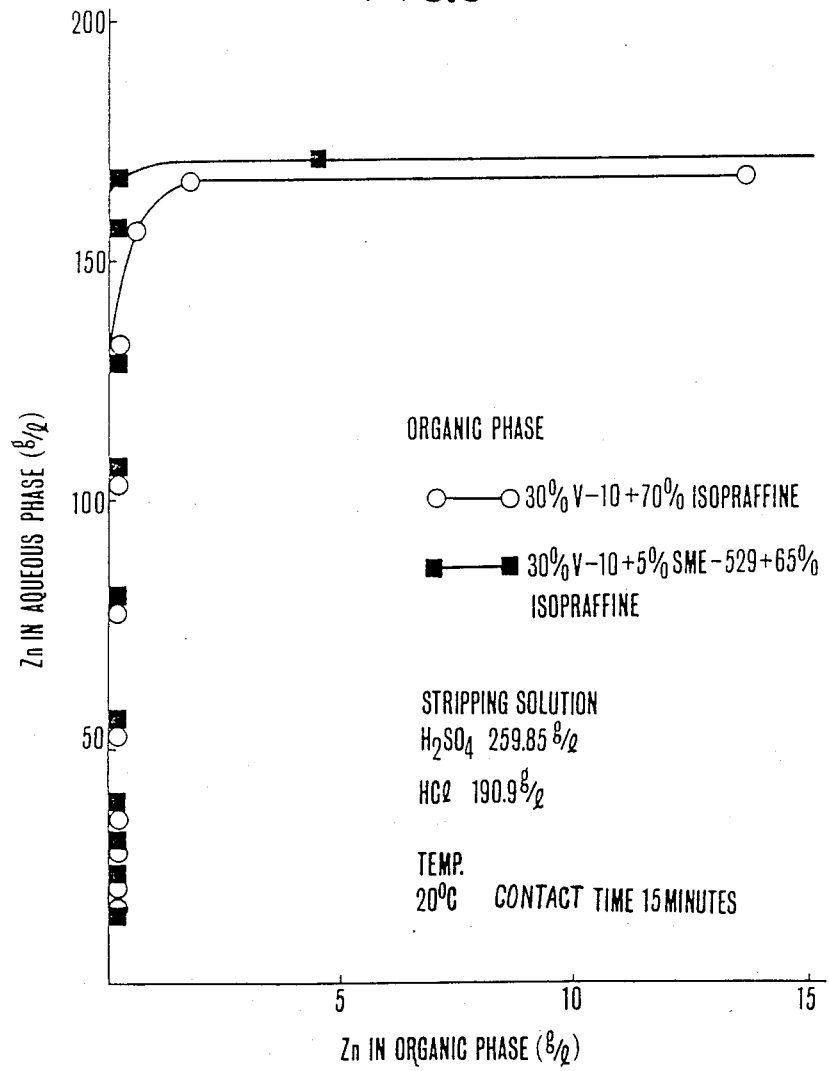

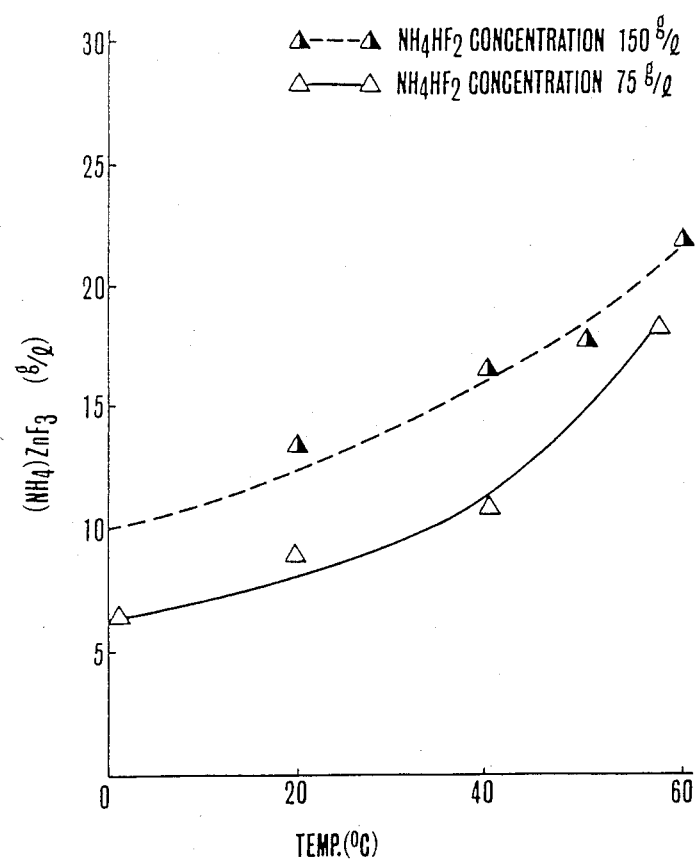

PROCESS FOR SELECTIVELY STRIPPING IRON IONS FROM AN ORGANIC SOLVENT

This is a continuation of application Ser. No. 449,826, filed Dec. 14, 1982, abandoned.

BACKGROUND OF THE INVENTION

Various raw materials containing zinc are discharged in the iron and steel industry and nonferrous metal industry. However, most of them are discarded because of their low contents of zinc and higher contents of iron in comparison of the zinc contents and consequently many problems in public circumstance protection have been brought out.

In the iron and steel industry, these materials are produced mainly in dust collectors treating exhaust gas from high temperature portions of blast furnaces, converters and electric furnaces, etc. While, in process industries, these materials are produced mainly in portions when scums formed in upper and under parts of fused zinc galvanizing tanks and fine dusts generated from the total surface thereof are treated and further dust collectors which exhaust gas from scrap-treating shops typically presented by junked car scrapping shops. In the nonferrous metal industry, these materials are produced from processing of leached residues in hydrometallur-gical refining processes, sludges in solution purifying processes, slags and exhaust gas in pyrometallurgical processes. However, as described above, valuable metals such as zinc, etc. cannot be recovered from these materials due to high contents of iron and these materials have long been wasted and discarded.

When the iron and zinc ions are contained in an aqueous solution, it has been known for separation of their ions that iron hydroxide is produced and removed by controlling pH values but this method has a disadvantage that zinc recovery is decreased due to a large amount of zinc which coprecipitates with iron hydroxide. Although the raw materials containing iron and zinc as mentioned above can be dissolved by acids, economical zinc recovery is very difficult due to coprecipi-tation of zinc with iron and consequently these materials have been discarded.

Norwegian Institute of Technology proposed a zinc recovery process for effective separation of zinc and iron from raw materials containing them without using acid. According to this process, ZnO in the raw materials is selectively leached in contact with an organic solvent containing Versatic acid without leaching.

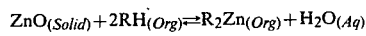

$$ZnO_{(Solid)} + 2RH_{(Org)} \rightleftharpoons R_2Zn_{(Org)} + H_2O_{(Aq)}$$

Furthermore, a process for recovering organic solvents remaining in large amounts in leached residues has been proposed in which the residues are washed with an aqueous solution containing NaOH and Na$_2$CO$_3$ and then with hot water. In this process, however, the residues containing the organic solvent become massive and consequently it is very difficult to recover the adhering organic solvents from the residues.

Typical samples of zinc containing raw materials discharged from the iron and steel industry are shown below.

|  | Fe | Zn | Pb | Ca | Na | Al$_2$O$_3$ | SiO$_2$ | C |
|---|---|---|---|---|---|---|---|---|
| Electric furnace dust: | 31.8 | 18.4 | 3.1 | 2.5 | 1.9 | 0.83 | 4.8 | 11.5 |
| Blast furnace dust: | 35.2 | 1.6 | 0.3 | 3.7 | — | 2.3 | 5.4 | 33.4 |

(in %)

As understood from the above, leaching process with an organic solvent containing versatic acid mentioned above is not economical for treating the materials, because of their low contents of zinc, large amounts of ZnO·Fe$_2$O$_3$, particularly in electric furnace dusts, and an increased loss of organic solvent adhered in the leached residues. The present inventors proposed a process for recovery of organic solvents adhering in residues, in which the residue is washed with isopropyl alcohol and acetone and then the organic solvent is recovered by fractional distillation of them. However, this process could not be industrially used owing to its complexity and high recovery cost.

Also a process is known in which iron making raw materials and raw materials containing large amounts of zinc are recovered from raw materials of low zinc content, such as blast furnace dust, by heating at 400°–1600° C. in a reducing atmosphere and volatilizing zinc and has been commercially adopted but the economical advantage of this process has been decreased by extraordinary enhancement in price of heating fuels.

For these and other reasons, raw materials containing less than 50% of zinc are not accepted by nonferrous smelters due to the economical disadvantages and are at present discarded.

This invention proposes a resource cycle system for treating economically liquid or solid raw materials which contain relatively higher contents of iron incomparison with zinc contents and cannot be economically treated by the conventional methods.

SUMMARY OF THE INVENTION

The present invention provides a process for selectively stripping and separating iron ions from an organic solvent (A) which comprises bringing the organic solvent (A) containing iron and zinc ions, and containing one or more compounds selected from the group consisting of alkyl phosphoric acid, alkyl-aryl phosphoric acid, alkyl thio phosphoric acid and alkyl-aryl thio phosphoric acid together with a petroleum hydrocarbon as a diluent, into contact with an aqueous solution containing NH$_4^+$ and F$^-$ ions so as to selectively strip the iron ions into the aqueous solution despite the coexistence of zinc ions.

DETAILED DESCRIPTION OF THE INVENTION

According to the present invention, the organic solvent (A) coextracts both iron and zinc ions or most of iron ions and a small amount of zinc ions from an aqueous solution containing iron and zinc ions. The iron ions extracted therein are selectively stripped from the resultant organic solvent in contact with an aqueous solution containing NH$_4^+$ and F$^-$ ions. The zinc ions in the resultant organic solvent are not stripped irrespective of the contact time with the aqueous solution containing NH$_4^+$ and F$^-$ ions, the concentrations of NH$_4^+$ and F$^-$ ions and pH values. Consequently the zinc ions can be separated from the iron ions. The resultant organic solvent containing only zinc ions is recycled to the extraction process for extraction of only iron ions from the aqueous solution containing iron and zinc ions.

Since zinc ions have a low extraction distribution ratio, they are not transferred to the aqueous phase. Thus loss of zinc ions can be avoided and only iron ions can be extracted by and recovered from the aqueous phase. Therefore, this process provides a process useful for removal of only $Fe^{3+}$ ions without the loss of zinc ions and other valuable metallic ions from metal plating solutions, such as, zinc galvanizing solutions.

Where zinc is to be recovered from solid raw materials containing zinc and iron, an aqueous solution containing mainly iron and zinc ions is obtained by dissolution of solid raw materials containing zinc and iron with acid, the iron ions therein are converted to $Fe^{3+}$ ions by oxygen aeration, oxidation with chemicals such as $H_2O_2$, etc. or electro-oxidation, and then $Fe^{3+}$ ions are extracted and removed from a strong acid region by contact with the organic solvent (A) containing one or more compounds selected from the group comprising alkyl phosphoric acid, alkyl-aryl phosphoric acid, alkyl thio phosphoric acid and alkyl-aryl thio phosphoric acid together with a petroleum hydrocarbon as a diluent. In this way, the acid consumed for dissolving the iron contained in the solid raw materials can be recovered and recycled to the dissolution process of raw materials.

This fact indicates that only iron can be separated and recovered from other metals without consumption of acid or alkali so that low iron contents do not cause economical disadvantages. Therefore, metal values can be economically recovered from various industrial wastes. $HNO_3$ or aqueous solution containing $HNO_3 + H_2SO_4$ or $HNO_3 + HCl$ can be used for dissolution of raw materials in order to omit the oxidation process of iron ions in the aqueous solution after dissolution process of raw materials.

Since $Fe^{3+}$ ions can be extracted and removed by the organic solvent (A) from the region of strong acid such as a nitric acid solution and a mixed solution containing $HNO_3 + H_2SO_4$ or $HNO_3 + HCl$, the acid after removal of the $Fe^{3+}$ ions can be recycled to dissolve the raw materials.

Where the amount of metallic ions, such as, the zinc ions (except for the iron ions) increases, at least stoichiometric amounts of $H_2SO_4$ or HCl with respect to the metallic ions are added to dissolve the raw materials. This is a well known recovery process for $HNO_3$ and $HNO_3$ wherein the aqueous solution is extracted by an organic solvent containing phosphoric acid ester and the contained metal salts are converted to the corresponding metal sulphate or metal chloride as shown in the following equations.

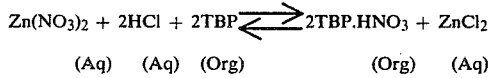

(1)

(Aq)  (Aq)  (Org)     (Org)   (Aq)

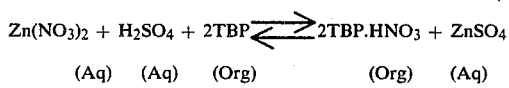

(2)

(Aq)  (Aq)  (Org)     (Org)   (Aq)

Nitric acid extracted into the organic phase is stripped and recovered to an aqueous phase in contact with water and can be used to dissolve the raw materials.

In the case of treating solid raw materials containing ZnO, the zinc oxide in the solid raw materials is extracted to an organic phase in contact with an organic solvent (B) comprising one or more compounds selected from the group of carboxylic acids together with a petroleum hydrocarbon as a diluent at the first stage as shown in the following equation.

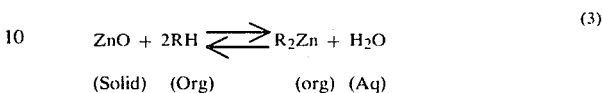

(3)

(Solid) (Org)      (org) (Aq)

As a large amount of the organic solvent (B) is adhering on the leached residue discharged from the first stage, this process does not become an economical one unless the adhering organic solvent can be recovered and the raw materials contain large amounts of ZnO.

In the second stage, the organic solvent (B) is recovered by dissolution of the residue with an aqueous solution containing one or more acids selected from HCl, $H_2SO_4$ and $HNO_3$. Since the residue undissolved by the acid is generally under 15% of the raw materials prior to the leaching process in the first stage, loss of the organic solvent (B) by adhesion is very small.

As the dissolution solution in the second stage contains mainly iron and zinc ions and the iron ions in the above aqueous solution can be selectively extracted in contact with the organic solvent (A), HCl, $H_2SO_4$ and $HNO_3$ used for dissolution of iron can be recovered in the third stage as shown in the following equations.

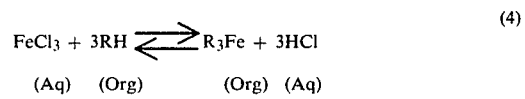

(4)

(Aq)   (Org)        (Org)  (Aq)

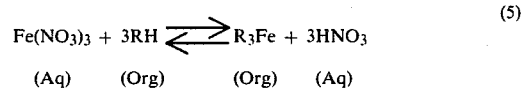

(5)

(Aq)    (Org)        (Org)  (Aq)

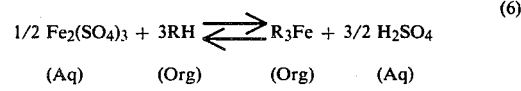

(6)

(Aq)       (Org)        (Org)    (Aq)

where RH indicates an extractant having H type-exchange radical.

The iron ions extracted in the organic solvent (A) are stripped by an aqueous solution containing $NH_4^+$ and $F^-$ ions as disclosed by the present inventors and the organic solvent (A) is regenerated as shown in the following equation.

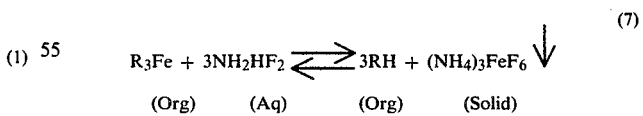

(7)

(Org)     (Aq)      (Org)    (Solid)

The acids(HCl, $H_2SO_4$ and $HNO_3$) regenerated through the removal of iron ions in the third stage are recycled to the dissolution process of residues in the second stage.

The organic solvent (B) containing zinc ions used for leaching ZnO in the first stage is regenerated by contact with an aqueous solution containing HCl, $H_2SO_4$, $HNO_3$ or $NH_4^+$ and $F^-$ ions as shown in the following equations and zinc can be recovered in the fourth stage.

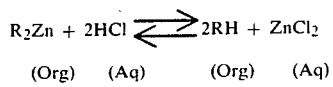 (8)

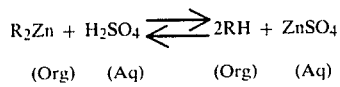 (9)

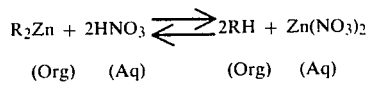 (10)

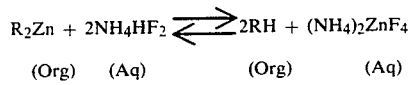 (11)

The process for producing metallic zinc and zinc oxide from $(NH_4)_2ZnF_4$ formed in the equation (11) has been already proposed by the present inventors.

As mentioned above, this invention relates to a process in which metal values such as iron and zinc, etc. can be separated by selective removal of iron ions from various aqueous solutions.

The extractant of alkyl phosphoric acid group used in this invention is selected from the compounds (A) to (F) shown below:

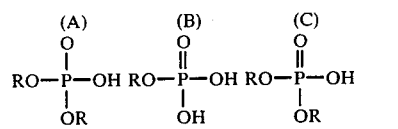

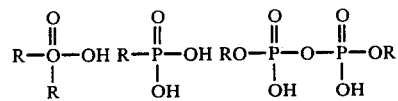

where R is alkyl radical containing 4 to 14 carbon atoms. D2EHPA (Di-2-ethyl hexyl phosphoric acid) shown in the example set forth hereinafter belongs to the (A) group having alkyl radical of $C_8H_{17}$.

The extractant of alkyl-aryl phosphoric acid group used in this invention includes the compounds shown below:

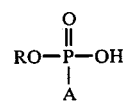

where R is an alkyl radical having 4 to 14 carbon atoms and A is an aryl radical (phenyl, triyl, xylyl, etc.). OPPA (Octyl phenyl phosphoric acid) shown in the example set forth hereinafter has an alkyl radical of $C_8H_{17}$ and an aryl radical of $C_6H_5$.

The extractant of alkyl thio phosphoric acid group and alkyl-aryl thio phosphoric acid group used in this invention are selected from the compounds shown below:

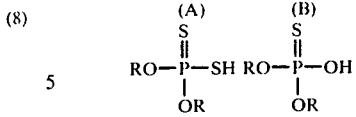

where R is alkyl or aryl radical having 4 to 22 carbon atoms. D2EHDTPA (Di-2-ethyl hexyl dithio phosphoric acid) shown in the example set forth hereinafter belongs to the (A) group having an alkyl radical of $C_8H_{17}$.

The extractant used as the organic solvent (B) in this invention is shown below. Carboxylic acid group used in this invention is selected from the following compounds.

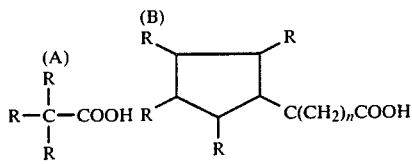

where R is an alkyl radical having 4 to 18 carbon atoms. Versatic acid 10 (V-10) (tradename, produced by Shell Chemical Co.) shown in the example belongs to the (A) group having an alkyl radical of 9 to 11 carbon atoms.

The extractant of hydroxime used in this invention includes the compound shown below:

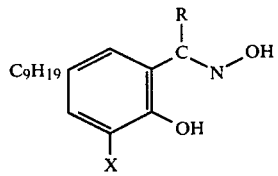

where R is

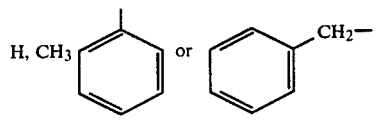

and X is Cl or H. Similar hydroximes can be naturally used in this invention. SME-529 (tradename, produced by Shell Chemical Co.) used in the example is a hydroxime in which R $=CH_3$.

The petroleum hydrocarbon used in this invention is alphatic or aromatic hydrocarbon or mixture of these compounds. The commercial mixture of various hydrocarbons such as kerosene is often used.

The concentration of extractant in the organic solvent lies in the range of 2 to 75 volume % and higher alcohol including 6 to 34 carbon atoms as a modifier may be added in response to need. The concentration of extractant in the organic solvent is determined according to concentrations of iron and zinc ions and kind or concentration of anion and other heavy metallic ions in the aqueous solution. Moreover, the kind or concentration of the extractant is determined according to the conditions under which it is reused such as in zinc electrowinning and galvanizing processes.

Raw materials to be used in this invention which comprise iron ions extracted and a small amount of zinc ions coextracted in the organic solvent are obtained from the following solutions.

(1) surface treating solutions and metal plating solutions in iron and steel works;
(2) surface treating solutions of piping materials, sheets or plates, etc.;
(3) aqueous solution used for organic reaction;
(4) any optional nonferrous metallurgical solutions in which mainly iron and zinc are contained and other heavy metallic ions may be involved.

Solid raw materials containing zinc are obtained from the following materials.

(1) dust obtained in dust collectors of exhaust gas from blast furnaces, converters or electric furnaces in iron and steel works;
(2) scum of upper and under parts of fused zinc plating tanks;
(3) dust obtained in dust collectors of exhaust gas around the tank;
(4) sludge and leached residues obtained in solution purifying process in nonferrous metallurgy;
(5) slag discharged from pyro-furnaces such as reverberatory furnaces, electric furnaces, flash smelting furnaces, crucible furnaces, etc.;
(6) oxide ore or silicate ore containing low zinc contents; and
(7) materials containing iron, manganese, copper, nickel and cobalt, etc. such as manganese nodule.

The present invention will be described in more detail with reference to the attached drawings. Of course, this invention is not limited to the following description of embodiments.

BRIEF EXPLANATION OF THE DRAWINGS

FIG. 1 shows a flow-sheet of the process for separation and recovery of only iron ions from the organic solvent (A) containing extracted them and coexisted zinc ions according to the present invention.

FIG. 2 shows a flow-sheet of the process for selective recovery of iron ions from optional aqueous solutions which are originated from surface treating process, metal plating process or leaching process and contain mainly iron and zinc ions and other heavy metallic ions except those and various anion ions may exist.

FIG. 3 is a flow-sheet for economical recovery of zinc by treatment of solid raw materials containing mainly iron and zinc.

FIG. 4 is a flow-sheet for effective recovery of zinc by treatment of solid raw materials containing iron and mainly zinc as ZnO.

FIG. 9 is a graph showing the relation between amounts of Zn in the aqueous phase and those in the organic phase in the case using the organic solvent (B).

FIG. 10 is a graph showing the relation between temperature of the aqueous solution containing $NH_4^+$ and $F^-$ ions and solubility of $(NH_4)_3FeF_6$ and $(NH_4)_2ZnF_4$.

The organic solvent (A) (1)* containing extracted iron ions is introduced to stripping stage (2)* in order to contact with an aqueous solution (3)* containing $NH_4^+$ and $F^-$ ions and only iron ions are transferred to the aqueous phase so as to separate the coextracted zinc ions as shown in the following equation.

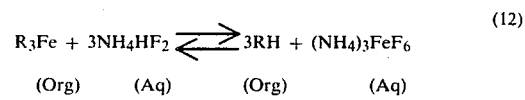

(Org)    (Aq)    (Org)    (Aq)

Figure 5:
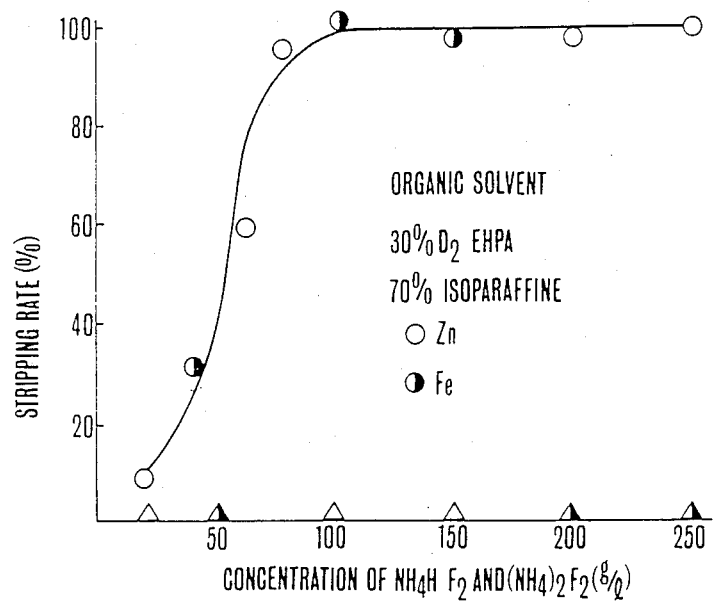
FIG. 5 is a graph showing the relation between stripping percentage of zinc and iron ions extracted in the organic solvent (A) and concentration of aqueous solution containing $NH_4^+$ and $F^-$ ions.
Figure 6:
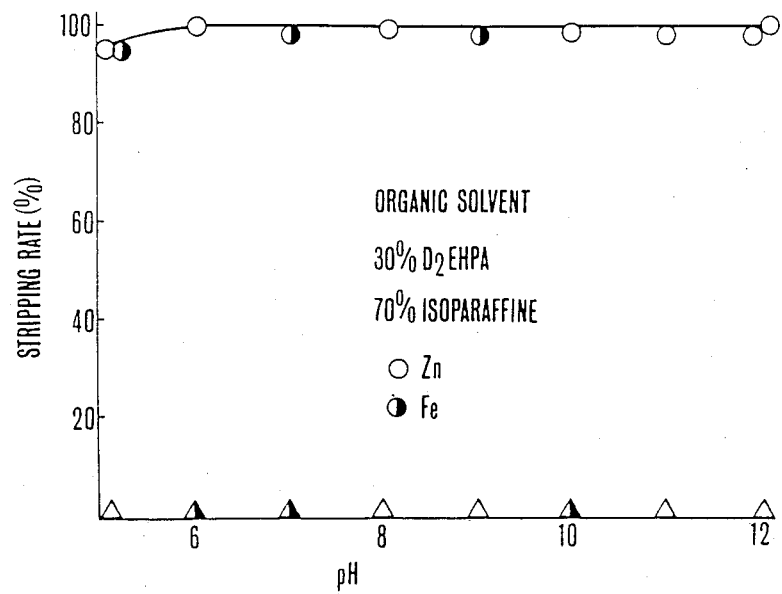
FIG. 6 is a graph showing the relation between stripping percentage of zinc and iron ions extracted in the organic solvent (A) and pH of aqueous solution containing $NH_4^+$ and $F^-$ ions.

The zinc ions contained in the organic phase together with the iron ions do not transfer into the aqueous phase irrelevant to contacting time with the aqueous solution involving $NH_4^+$ and $F^-$ ions, pH values or temperature of solution as shown in FIGS. 5 and 6.

In FIG. 2, the optional solution (4)* containing mainly iron and zinc ions is transferred to the extraction stage (1)* in order to selectively extract the iron ions by contact with the organic solvent (A) and then zinc ions are coextracted according to pH value and concentration of those.

Scrubbing stage of only zinc ion from the organic phase using dilute acid prior to the stripping stage (2)* of iron ion has been adopted in the conventional process. However, there is a disadvantage requiring a treatment of the scrubbing solution including zinc ions.

In this invention, the organic solvent (A) containing iron and zinc ions is contacted with the aqueous solution (3)* involving $NH_4^+$ and $F^-$ ions in the stripping stage (2)* in order to transfer the iron ions extracted in the organic phase into the aqueous phase as shown in equation (12). Then, only zinc ions remain in the organic phase because the reaction shown in equation (13) does not occur.

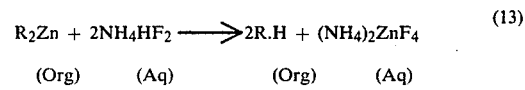

(Org)    (Aq)    (Org)    (Aq)

The organic solvent (A) containing zinc ions is recycled to the extraction stage (5)* the iron ions are selectively extracted by exchange reaction from the optional aqueous solution (4)* as shown in equations (14) and (15) and the separability of iron and zinc ions is enhanced.

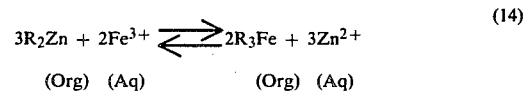

(Org)    (Aq)    (Org)    (Aq)

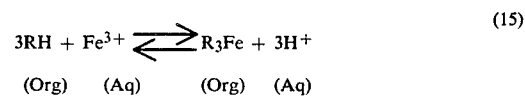

(Org)    (Aq)    (Org)    (Aq)

As the result, only iron ions from the aqueous solution (4)* taken from the place originating raw materials get out the system as a crystal of $(NH_4)_3FeF_6$ (7)*.

Metallic iron or iron oxide is produced by thermal decomposition of $(NH_4)_3FeF_6$ in hydrogen gas stream or gas stream containing oxygen or $H_2O$ as shown in equations (16) to (18) and simultaneously $NH_4HF_2$, $NH_4F$ and F gases generated in the thermal decomposition are absorbed and recovered.

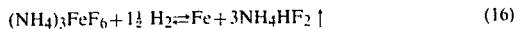

(16)

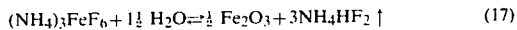

(17)

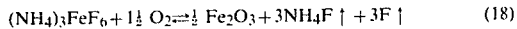

(18)

In FIG. 3, raw material (14)* is introduced to acid leaching stage (6)* in order to leach iron and zinc, etc. (of course, other valuable metals except zinc, such as nickel, cobalt, etc. may be leached) by contact with an aqueous solution containing one or more acids selected from HCl, $H_2SO_4$ and $HNO_3$. After the iron is oxidized in order to convert to $Fe^{3+}$ ion in response to need (if leached with an aqueous solution containing $HNO_3$, oxidation stage is omitted), the aqueous solution (4)* containing mainly iron and zinc is transferred to the extraction stage (5)* in order to extract iron ions into the organic phase by contact with the organic solvent (A) and most of raffinate is recycled to the acid leaching stage (6)*.

The raffinate containing zinc ions (nickel, cobalt, etc. besides zinc are contained) is introduced to the extraction stage (11)* of zinc according to increase of zinc ion in the raffinate. If the raffinate contains $HNO_3$, it is transferred to the extraction state (9)* of $HNO_3$ in order to extract $HNO_3$ with contact of an organic solvent containing neutral phosphoric acid ester. $HNO_3$ transferred to the organic phase is introduced to the stripping stage (10)* to strip into an aqueous phase from the organic phase by contact with water and is recycled to the acid leaching stage (6)*.

Iron ions transferred to the organic solvent (A) (zinc ion may be coextracted) is introduced to the stripping stage (2)* in order to strip from the organic phase by contact with an aqueous solution (3)* containing $NH_4^+$ and $F^-$ ions. Zinc ions in the organic phase are not at all stripped and recycled to the extraction stage (5)*. Iron ions stripped in the aqueous phase are introduced out of the system as a crystal of $(NH_4)_3FeF_6$ (7)*.

In FIG. 4, the solid raw material is introduced to the ZnO leaching stage (16)* in order to selectively extract ZnO with contact of the organic solvent (B) as shown in equation (3). Zinc ions transferred in the organic phase are stripped in the following stripping stage (17)* by contact with HCl, $H_2SO_4$, $HNO_3$ or an aqueous solution containing $NH_4^+$ and $F^-$ ions and recovered in form of $ZnCl_2$, $ZnSO_4$, $Zn(NO_3)_2$ or $(NH_4)_2ZnF_4$, respectively and simultaneously the organic solvent (B) is regenerated.

Figure 8:
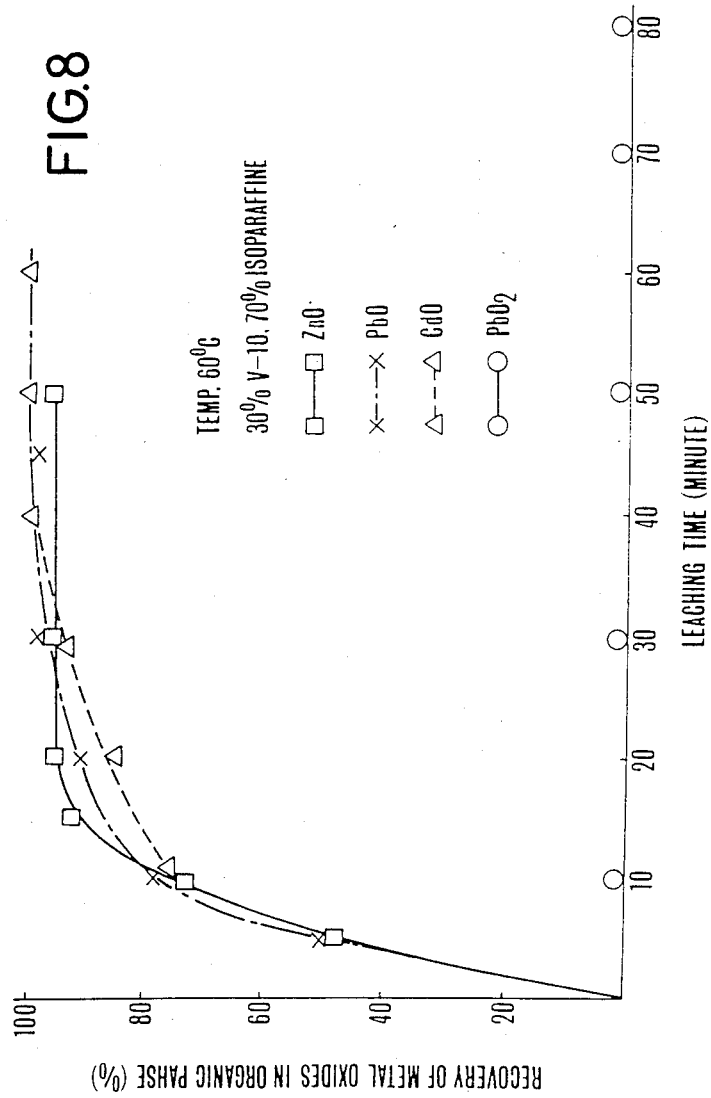
FIG. 8 is a graph showing the relation between leaching percentage of ZnO, PbO, CdO and $PbO_2$ by the organic solvent (B) and leaching time.

If the raw material involves CdO and PbO, those are leached as well as zinc in the direct leaching stage (16)* by the organic solvent as shown in FIG. 8 and transferred to the organic phase. These impurities can be selectively transferred into the aqueous phase from the organic phase by contact with an aqueous solution (18)* below pH 5 in the scrubbing stage (17)* and consequently only zinc ions exist in the organic phase and high purity zinc salts (13)* are recovered in the following stripping stage (19)*.

Since the leached residue discharged from the ZnO leaching stage (16)* contains large amounts of the organic solvent (B), it is recovered by dissolution of the residue with an aqueous solution (15)* containing one or more acids selected from HCl, $H_2SO_4$ or $HNO_3$ in the following acid leaching stage (6)*. Undissolved residue (8)* is abandoned after water washing.

The aqueous solution (4)* containing mainly iron and zinc ions is transferred to the iron extraction stage (5)* in order to extract iron ions by contact with the organic solvent (A) after oxidation, if necessary. The organic solvent (A) containing iron ions is introduced to the stripping stage (2)* in order to transfer those into the aqueous phase by contact with an aqueous solution containing $NH_4^+$ and $F^-$ ions and simultaneously regenerated.

The aqueous solution containing zinc ions after removal of iron ions is introduced to the zinc extraction stage (11)*. If $HNO_3$ solution (15)* is used in the acid leaching stage (6)*, the above aqueous solution is transferred to the zinc extraction stage (11)* after extraction and recovery of $HNO_3$ by contact with an organic solvent containing neutral phosphoric acid ester in the $HNO_3$ extraction stage (9)*. Zinc ions extracted in the organic phase produce various zinc salts (13)* by contact with HCl, $H_2SO_4$, $HNO_3$ or an aqueous solution containing $NH_4^+$ and $F^-$ ions as shown in equations (8) to (11).

The aqueous solution (4)* containing iron and zinc ions in this invention is an optional solution containing one or more acids selected from the group consisting of sulphuric acid, hydrochloric acid, nitric acid, acetic acid, gluconic acid, citric acid, oxalic acid, salicylic acid, hydrofluoric acid, etc.

Heavy metallic ions coexisting with iron and zinc ions in the raw materials are consisting of Mn, Al, Ni, Co, Pb, Sn, Mg, Mo, W, As, Cu ions, etc.

DETAILED DESCRIPTION OF THE PREFERRED EMBODIMENTS

The following examples are based on the experiment carried out by the inventors.

EXAMPLE 1

The organic solvent (A) which comprises 30% D2EHPA +70% n-paraffine and contains 10.5 g/l of iron and 1.1 g/l of zinc was stripped with various aqueous solutions containing $NH_4^+$ and $F^-$ ions. The results are shown in Table 1.

TABLE 1

| | | Stripping Percentage (%) Concentration of Aqueous Solution Containing $(NH_4)_2F_2$ & $NH_4HF_2$ | | | | | |
|---|---|---|---|---|---|---|---|
| pH | metal | 20 g/l | 50 g/l | 100 g/l | 150 g/l | 200 g/l | 250 g/l |
| 5 | Fe | 10.1 | 31.0 | 90.9 | 95.1 | 100.0 | 100.0 |
| | Zn | 0 | 0 | 0 | 0 | 0 | 0 |
| 7 | Fe | — | 91.4 | 98.7 | 99.9 | 100.0 | — |
| | Zn | — | 0 | 0 | 0 | 0 | — |
| 9 | Fe | 49.7 | 99.3 | 100.0 | — | — | — |
| | Zn | 0 | 0 | 0 | — | — | — |
| 10 | Fe | 67.2 | 100.0 | 100.0 | — | — | — |
| | Zn | 0 | 0 | 0 | — | — | — |

The relationship between pH values of strip solutions and stripping percentages of iron and zinc ions in the organic phase is shown in FIG. 6. The mole ratio of contained ammonium and fluorine linearly changes with pH values. It is clear from these results that only iron ions can be selectively transferred into the aqueous phase (strip solution) from the organic solvent containing iron and zinc ions and consequently zinc ions remain in the organic phase and can be recycled to the extraction stage.

EXAMPLE 2

The results of iron extraction from the aqueous solution containing mainly iron and zinc ions are shown in Table 2.

TABLE 2

| pH and ion concentration of the initial aq. phase | | ion concentration in the aq. phase after extraction | | ion concentration in the org. phase after extraction | | extraction distribution ratio | |
|---|---|---|---|---|---|---|---|
| pH | Zn g/l | Fe (%) | Zn g/l | Fe (%) | Zn g/l | Fe g/l | Zn | Fe |
| 1.0 | 56.08 | 0.105 | 55.22 | 0.00071 | 8.25 | 1.14 | 0.23 | 163.3 |
| 0.5 | 161.86 | 0.0994 | 160.58 | 0.000260 | 17.48 | 1.20 | 0.11 | 3.9 |
| 0.0 | 383.90 | 0.090 | 381.39 | 0.000409 | 25.43 | 1.009 | 0.06 | 2.5 |

It is shown from Table 2 that only iron ions can be selectively extracted by maintaining an extremely high $H^+$ ion concentration in the initial aqueous phase, but zinc cannot be prevented from coextraction, where it is impossible to maintain a high $H^+$ ion concentration or an extraordinarily high zinc ion concentration in comparison with the iron ion concentration.

EXAMPLE 3

Analysis of dust generated in a fused zinc plating process is shown below.

| Fe | Zn | Pb | Mn | F | Cl |
|---|---|---|---|---|---|
| 1.6% | 65.9% | 3.1% | 0.32% | 0.15% | 27.7% |

Figure 7:
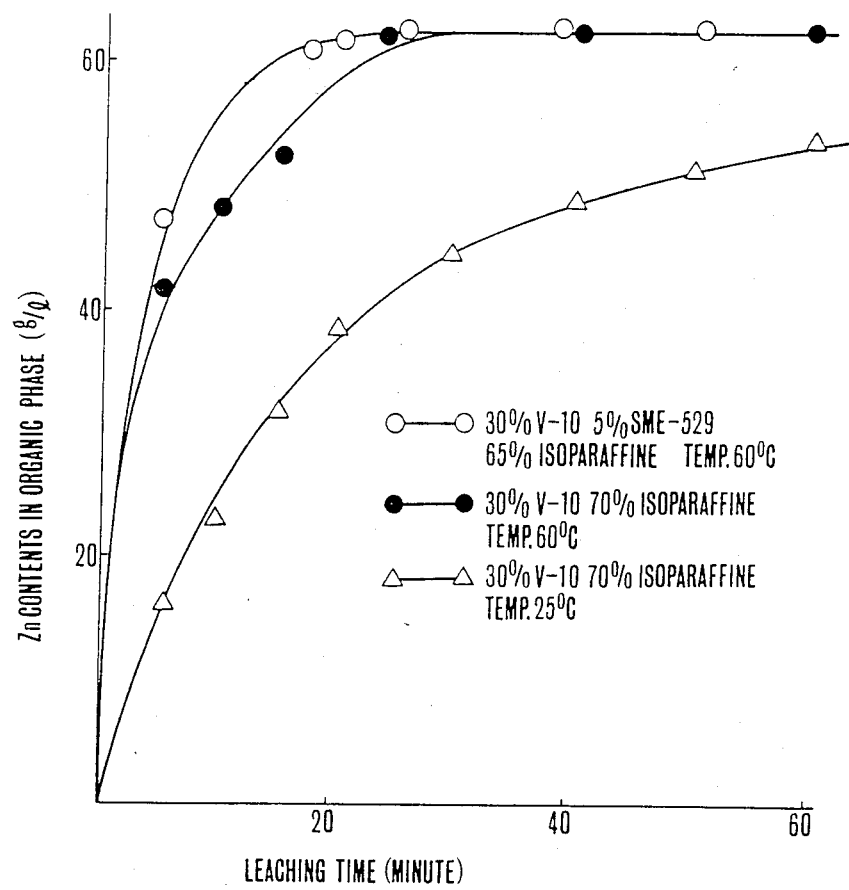
FIG. 7 is a graph showing the relation between amounts of ZnO leached by the organic solvent (B) and leaching time.

1000 g of the above dust was used for the test. The organic solvent (B) used comprises 30% V-10 and 70% isoparaffine. The results of leaching tests are shown in FIG. 7. 224 g of leached residue having the following composition was obtained.

| Fe | Zn | Pb | Mn | F | Cl |
|---|---|---|---|---|---|
| 7.12% | 23.3% | 15.8% | 1.41% | 0.82% | 12.59% |

0.32 g of the organic solvent (B) was contained in 1 g of residue.

The amount of undissolved residue was 18 g after dissolution of the above one by 180 g/l $HNO_3$ and all the adhering organic solvent (B) could be recovered.

The composition of $HNO_3$ dissolving solution is shown below.

| Fe | Zn | Pb | Mn |
|---|---|---|---|
| 22.7 g/l | 74.56 g/l | 8.4 g/l | 4.5 g/l |

Iron concentration in the above solution could be decreased under 0.008 g/l by twice contact with the organic solvent containing 30% D2EHPA and 70% n-paraffine.

EXAMPLE 4

The organic solvent (B) which comprises 30% V-10, 5% SME-529 and 65% isoparaffine and contains amounts of Zn, Cd and Pb ions as shown in the following table was used for the test.

| Zn | Cd | Pb |
|---|---|---|
| 62.08 g/l | 3.229 g/l | 3.689 g/l |

An aqueous solution containing $ZnCl_2$, $ZnSO_4$ or $Zr(NO_3)_2$ is selected as a scrubbing solution of Pb and Cd coextracted and the scrubbing result based on the O/A ratio of 10/1 is shown in Table 3.

TABLE 3

| Zn salt | initial pH | Org phase after scrubbing | | | Aq phase after scrubbing | | | |
|---|---|---|---|---|---|---|---|---|
| | | Zn(g/l) | Cd(g/l) | Pb(g/l) | Zn(g/l) | Cd(g/l) | Pb(g/l) | pH |
| Zn Cl₂ | 3.0 | 62.63 | 0.003 | 0.04 | 39.71 | 0.342 | 0.369 | 5.0 |
| ZnSO₄ | 2.0 | 54.10 | 0.005 | 0.001 | 40.00 | 0.320 | 0.004 | 5.0 |
| Zn(NO₃)₂ | 1.0 | 61.97 | 0.05 | 0.04 | 19.71 | 0.320 | 0.37 | 5.0 |

It is found from Table 3 that almost Cd and Pb in the organic solution (B) can be recovered. After Pb ions in the organic phase are transferred to the aqueous phase by scrubbing with $ZnSO_4$, the amount of Pb in the aqueous phase does not exceed 0.004 g/l because it is crystallized as $PbSO_4$ crystal.

EXAMPLE 5

The results of stripping zinc ions extracted in the organic solvent (B) are shown in FIG. 9. In the Figure, —o—o— and — — — indicate 30% V-10 +70% isoparaffine and 30% V-10+5% SME-529+65% isoparaffine, respectively. 259.85 g/l $H_2SO_4$ and 190.9 g/l HCl were used as a strip solution and similar stripping results were obtained.

The results of stripping with aqueous solution containing $NH_4^+$ and $F^-$ ions are shown below.

| Organic solvent | Zn Concentration in the initial Org phase | Zn Concentration after stripping |
|---|---|---|
| 30% V-10 + 70% isoparaffine | 63.00 g/l | 0.003 g/l |
| 30% V-10 + 5% SME-529 + 65% isoparaffine | 41.33 g/l | 0.007 g/l |

It could be confirmed that zinc ions transferred into the aqueous phase were crystallized as $(NH_4)_2ZnF_4$ crystal.

What we claim:

1. A process for the recovery of zinc in the form of zinc ammonium fluoride, zinc chloride, zinc sulfate or zinc nitrate from solid raw materials containing zinc and iron which comprises:

(1) leaching a solid raw material containing zinc and iron by contacting with a first organic solvent which comprises one or more carboxylic acids selected from the group consisting of compounds having the formula

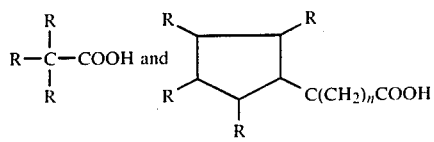

wherein R is an alkyl radical having from 4–18 carbon atoms, together with a petroleum hydrocarbon as a diluent for said organic solvent, (2) recovering the first organic solvent discharged from the first step by dissolution with an aqueous solution containing one or more acids selected from the group consisting of HCl, $H_2SO_4$ and $HNO_3$, (3) selectively extracting Fe ions from the resultant aqueous solution containing mainly iron and zinc ions from the second step by contact with a second organic solvent, containing one or more phosphoric acid compounds selected from the group consisting of compounds having the formula

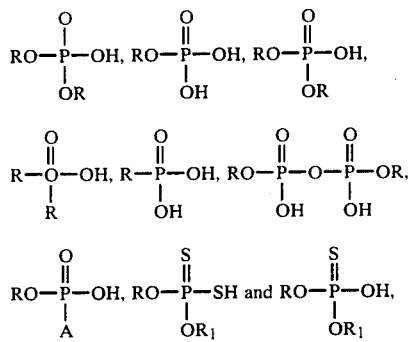

wherein
R is an alkyl radical containing from 4–14 carbon atoms,
A is an aryl,
$R_1$ is an alkyl or aryl radical having from 4–22 carbon atoms, (4) regenerating the first organic solvent containing zinc from the first step by contacting it with an aqueous solution containing an acid selected from the group consisting of HCl, $H_2SO_4$, $HNO_3$ or $NH_4^+$ and $F^-$ ions, and (5) recovering the corresponding zinc chloride, zinc sulfate, zinc nitrate or zinc ammonium fluoride from the aqueous solution.

2. The process of claim 1 in which the first organic solvent contains one or more compounds selected from the hydroxime group having the formula

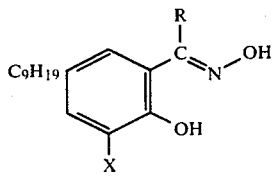

wherein X is Cl or H, and R is

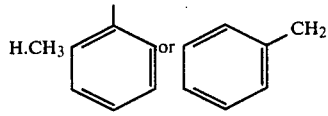

in the range of from 0.1 to 15 volume percent.

3. The process of claim 1 in which the raw material also contains lead and cadmium and the lead and cadmium are coextracted with the zinc and are selectively removed from the first organic solvent containing zinc from the first step by contacting it with the aqueous solution having a pH under 5.

* * * * *